US012664152B2

(12) United States Patent
Dutchak et al.

(10) Patent No.: US 12,664,152 B2
(45) Date of Patent: \*Jun. 23, 2026

(54) METHOD AND SYSTEM FOR DATA STORAGE AND RETRIEVAL

(71) Applicant: Abaxx Technologies Corp., Christ Church (BB)

(72) Inventors: John Dutchak, Palm Harbor, FL (US); Cory Moreira, Palm Harbor, FL (US); Dhiraj Rattan, Gilbert, AZ (US); Carlos Korten, Natick, MA (US); Christopher A. Wiklof, Everett, WA (US)

(73) Assignee: ABAXX TECHNOLOGIES CORP., Christ Church (BB)

( * ) Notice: Subject to any disclaimer, the term of this patent is extended or adjusted under 35 U.S.C. 154(b) by 0 days.

This patent is subject to a terminal disclaimer.

(21) Appl. No.: 18/956,565

(22) Filed: Nov. 22, 2024

(65) Prior Publication Data

US 2025/0124021 A1 Apr. 17, 2025

Related U.S. Application Data

(63) Continuation of application No. 17/113,082, filed on Dec. 6, 2020, now Pat. No. 12,153,567.

(51) Int. Cl.
*G06F 16/00* (2019.01)
*G06F 16/182* (2019.01)
(Continued)

(52) U.S. Cl.
CPC ........ *G06F 16/2379* (2019.01); *G06F 16/182* (2019.01); *G06F 16/219* (2019.01);
(Continued)

(58) Field of Classification Search
CPC .. G06F 16/2379; G06F 16/182; G06F 16/219; G06F 16/252; G06F 21/602;
(Continued)

(56) References Cited

U.S. PATENT DOCUMENTS 10,505,726 B1 12/2019 Andon et al.
2002/0138297 A1 9/2002 Lee
(Continued)

FOREIGN PATENT DOCUMENTS

KR 10-2006-0102728 A 9/2006
WO 2017036546 A1 3/2017

OTHER PUBLICATIONS

Written Opinion issued Sep. 16, 2022, by the Intellectual Property Office of Singapore in corresponding Singaporean Patent Application No. 11202011749X (6 pages).
(Continued)

*Primary Examiner* — Dinku W Gebresenbet
(74) *Attorney, Agent, or Firm* — Panitch Scharze Belisario & Nadel LLP

(57) ABSTRACT

A computer method and system for automated storage and retrieval of data utilizes blockchain technology to enhance security and efficiency of data storage and access. When a data object is stored in a data storage system, a corresponding storage address is written onto a blockchain. When the data object is to be retrieved, the storage address is read from the blockchain and the data object is retrieved from the storage location.

17 Claims, 7 Drawing Sheets

(51) Int. Cl.

| | |
|---|---|
| *G06F 16/21* | (2019.01) |
| *G06F 16/23* | (2019.01) |
| *G06F 16/25* | (2019.01) |
| *G06F 21/60* | (2013.01) |
| *G06Q 20/06* | (2012.01) |
| *G06Q 20/36* | (2012.01) |
| *G06Q 50/18* | (2012.01) |
| *H04L 9/06* | (2006.01) |
| *H04L 9/40* | (2022.01) |
| *G06F 3/0484* | (2022.01) |
| *H04L 9/00* | (2022.01) |
| *H04L 9/30* | (2006.01) |
| *H04L 67/1097* | (2022.01) |

(52) U.S. Cl.
CPC .......... *G06F 16/252* (2019.01); *G06F 21/602*
(2013.01); *G06Q 20/0658* (2013.01); *G06Q*
*20/3672* (2013.01); *G06Q 20/3678* (2013.01);
*G06Q 50/184* (2013.01); *H04L 9/0637*
(2013.01); *H04L 9/0643* (2013.01); *H04L*
*63/0414* (2013.01); *G06F 3/0484* (2013.01);
*H04L 9/30* (2013.01); *H04L 9/50* (2022.05);
*H04L 67/1097* (2013.01)

(58) Field of Classification Search
CPC .... G06F 3/0484; G06F 16/9024; G06F 21/62;
G06F 21/6209; G06F 21/64; G06Q
20/0658; G06Q 20/3672; G06Q 20/3678;
G06Q 50/184; G06Q 50/18; H04L
9/0637; H04L 9/0643; H04L 63/0414;
H04L 9/30; H04L 9/50; H04L 67/1097;
H04L 63/12; H04L 9/3239
See application file for complete search history.

(56) References Cited

U.S. PATENT DOCUMENTS

| | | | |
|---|---|---|---|
| 2010/0250340 A1 | 9/2010 | Lee et al. | |
| 2010/0262530 A1 | 10/2010 | Malackowski et al. | |
| 2011/0282762 A1 | 11/2011 | Thomas | |
| 2013/0282617 A1 | 10/2013 | Sereboff | |
| 2014/0089498 A1 | 3/2014 | Goldfarb et al. | |
| 2016/0260169 A1 | 9/2016 | Arnold et al. | |
| 2016/0292178 A1 | 10/2016 | Manville et al. | |
| 2016/0292672 A1 | 10/2016 | Fay et al. | |
| 2017/0124107 A1* | 5/2017 | Emberson | G06F 16/1752 |
| 2017/0177898 A1* | 6/2017 | Dillenberger | H04L 9/3236 |
| 2017/0201503 A1* | 7/2017 | Jayasena | H04L 63/0876 |
| 2017/0212691 A1* | 7/2017 | Katsuki | G06F 3/065 |
| 2017/0264428 A1 | 9/2017 | Seger, II | |
| 2017/0322992 A1 | 11/2017 | Joseph et al. | |
| 2018/0041571 A1* | 2/2018 | Rogers | H04L 67/104 |
| 2018/0115426 A1 | 4/2018 | Andrade | |
| 2018/0191502 A1* | 7/2018 | Karame | H04L 63/12 |
| 2018/0262493 A1 | 9/2018 | Andrade | |
| 2018/0349396 A1* | 12/2018 | Blagojevic | G06F 16/13 |
| 2019/0012663 A1 | 1/2019 | Masters | |
| 2019/0188806 A1 | 6/2019 | Torrenegra et al. | |
| 2019/0286629 A1 | 9/2019 | Song et al. | |
| 2021/0028939 A1 | 1/2021 | Trevethan | |

OTHER PUBLICATIONS

Written Opinion dated Aug. 15, 2022 in corresponding Singapore Application No. 11202011748W, 6 pps.
Office Action (non-final), dated Apr. 27, 2023, issued in corresponding U.S. Appl. No. 17/113,082, 40 pages.
Katie Szilagyi, A Bundle of Blockchains—Digitally Disrupting Property Law, 48 Cumb. L. Rev. 9 (2017). (Year: 2017).
International Search Report and Written Opinion for International Application No. PCTIUS2019/035468 dated Sep. 30, 2019, 10 pgs.
International Preliminary Report on Patentability for International Application No. PCT/US2019!035468 dated Dec. 8, 2020, 6 pgs.
Office Action dated Sep. 7, 2023, issued in corresponding U.S. Appl. No. 17/113,080, 50 pgs.
Office Action (Final), dated Oct. 26, 2023, issued in corresponding U.S. Appl. No. 17/113,082, 40 pages.
International Search Report and Written Opinion for International Patent Application No. PCT/US2019/035469, mailed Sep. 26, 2019, 15 pages.
International Preliminary Report on Patentability for International Application No. PCT/US2019/035469, dated Dec. 8, 2020, 11 pages.
Office Action (non-final), dated Apr. 8, 2024, issued in related U.S. Appl. No. 17/113,080, 48 pages.
Written Opinion issued Feb. 2, 2024, by the Intellectual Property Office of Singapore in corresponding Singaporean Patent Application No. 11202011748W (4 pages).
Examiner Interview Summary Record (PTOL-413), dated Jan. 16, 2024, issued in corresponding U.S. Appl. No. 17/113,082, 4 pages.
Written Opinion issued Feb. 2, 2024, by the Intellectual Property Office of Singapore in corresponding Singaporean Patent Application No. 11202011748W (6 pgs).
Written Opinion, issued Mar. 29, 2024, in corresponding Singaporean Application No. 11202011749X, 6 pages.
Examination Report, issued on Sep. 2, 2024, in corresponding Singaporean Application No. 11202011749X, 2 pages.

* cited by examiner

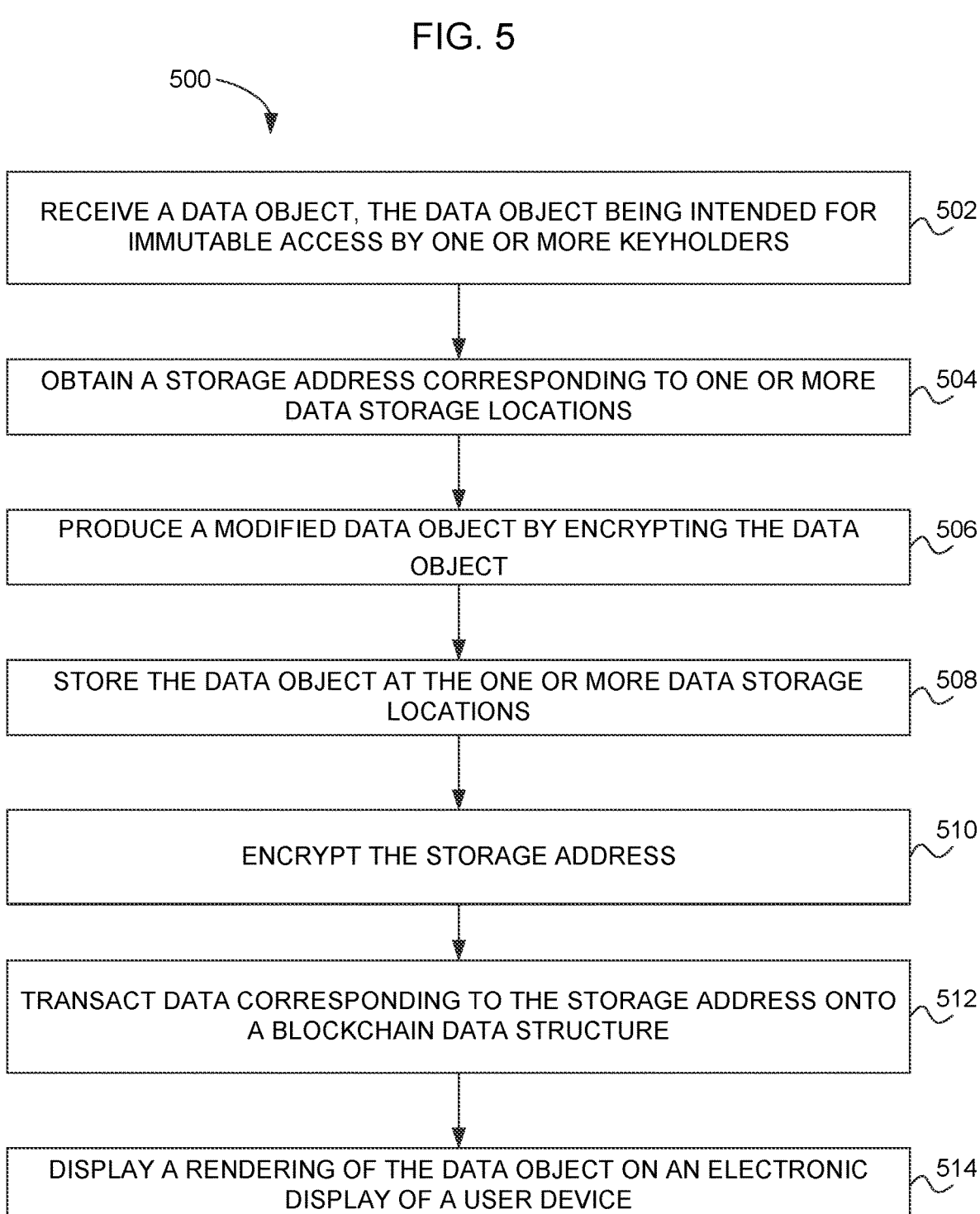

500

RECEIVE A DATA OBJECT, THE DATA OBJECT BEING INTENDED FOR IMMUTABLE ACCESS BY ONE OR MORE KEYHOLDERS    502

OBTAIN A STORAGE ADDRESS CORRESPONDING TO ONE OR MORE DATA STORAGE LOCATIONS    504

PRODUCE A MODIFIED DATA OBJECT BY ENCRYPTING THE DATA OBJECT    506

STORE THE DATA OBJECT AT THE ONE OR MORE DATA STORAGE LOCATIONS    508

ENCRYPT THE STORAGE ADDRESS    510

TRANSACT DATA CORRESPONDING TO THE STORAGE ADDRESS ONTO A BLOCKCHAIN DATA STRUCTURE    512

DISPLAY A RENDERING OF THE DATA OBJECT ON AN ELECTRONIC DISPLAY OF A USER DEVICE    514

FIG. 6

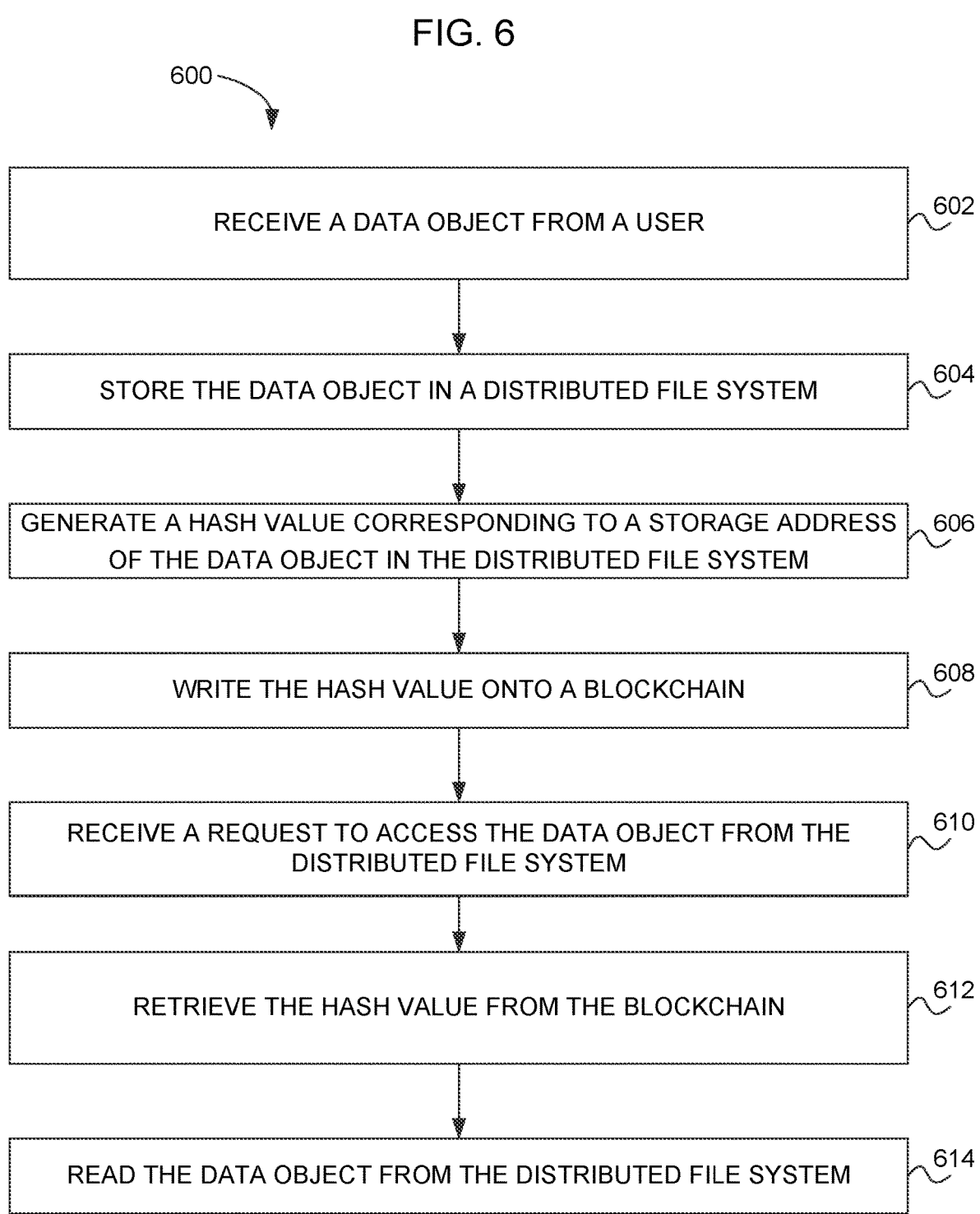

600

RECEIVE A DATA OBJECT FROM A USER        602

STORE THE DATA OBJECT IN A DISTRIBUTED FILE SYSTEM        604

GENERATE A HASH VALUE CORRESPONDING TO A STORAGE ADDRESS OF THE DATA OBJECT IN THE DISTRIBUTED FILE SYSTEM        606

WRITE THE HASH VALUE ONTO A BLOCKCHAIN        608

RECEIVE A REQUEST TO ACCESS THE DATA OBJECT FROM THE DISTRIBUTED FILE SYSTEM        610

RETRIEVE THE HASH VALUE FROM THE BLOCKCHAIN        612

READ THE DATA OBJECT FROM THE DISTRIBUTED FILE SYSTEM        614

Figure 7:
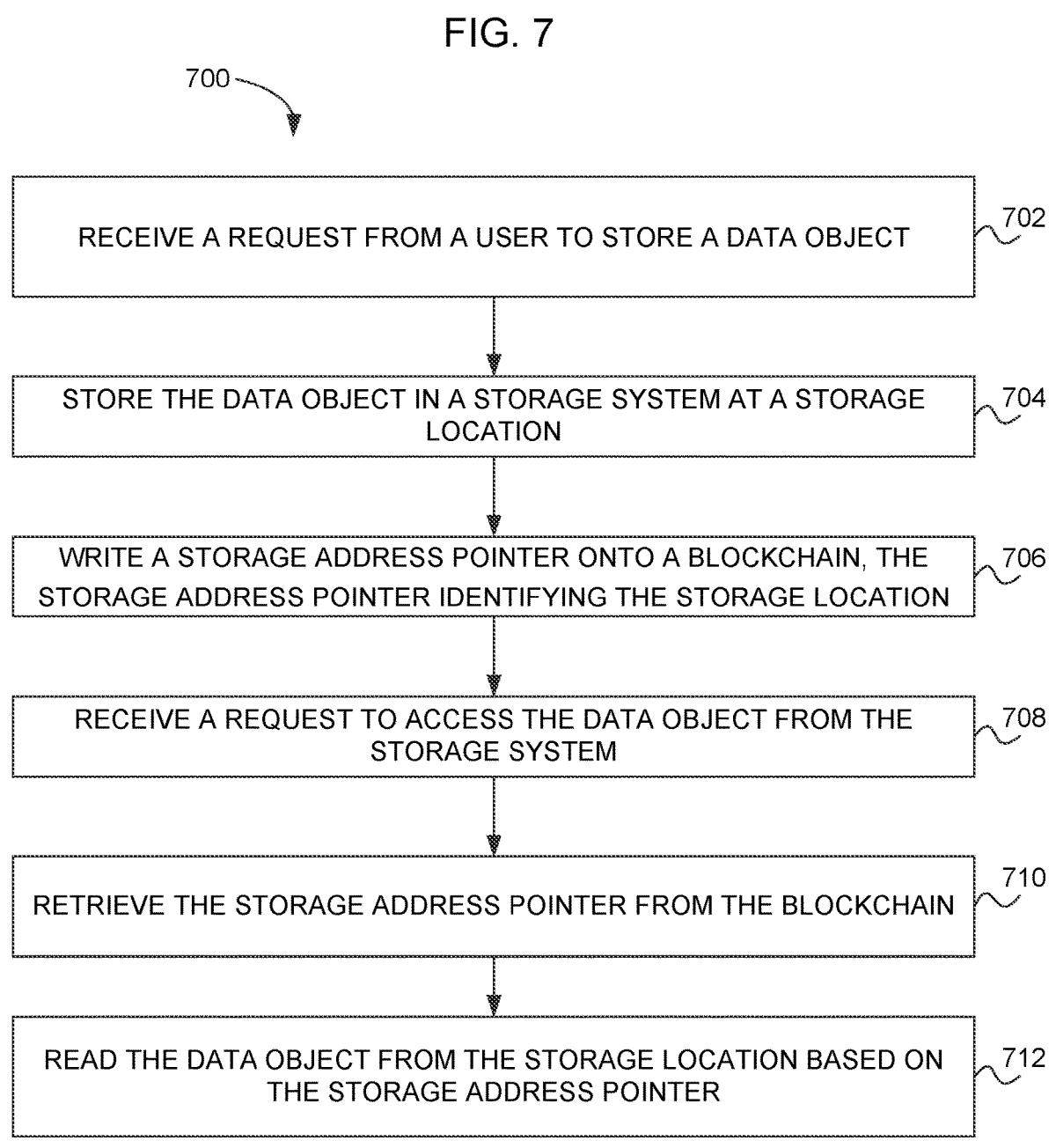

RECEIVE A REQUEST FROM A USER TO STORE A DATA OBJECT ~702

STORE THE DATA OBJECT IN A STORAGE SYSTEM AT A STORAGE LOCATION ~704

WRITE A STORAGE ADDRESS POINTER ONTO A BLOCKCHAIN, THE STORAGE ADDRESS POINTER IDENTIFYING THE STORAGE LOCATION ~706

RECEIVE A REQUEST TO ACCESS THE DATA OBJECT FROM THE STORAGE SYSTEM ~708

RETRIEVE THE STORAGE ADDRESS POINTER FROM THE BLOCKCHAIN ~710

READ THE DATA OBJECT FROM THE STORAGE LOCATION BASED ON THE STORAGE ADDRESS POINTER ~712

METHOD AND SYSTEM FOR DATA STORAGE AND RETRIEVAL

CROSS-REFERENCE TO RELATED APPLICATIONS

The present application is a U.S. Continuation application of U.S. patent application Ser. No. 17/113,082, filed Dec. 6, 2020, which claims priority benefit under 35 U.S.C. § 120 of co-pending International Patent Application No. PCT/US2019/035469, entitled "METHOD AND SYSTEM FOR DATA STORAGE AND RETRIEVAL," filed Jun. 4, 2019. International Patent Application No. PCT/US2019/035469 claims priority benefit of U.S. Provisional Patent Application No. 62/681,364, entitled "BLOCKCHAIN STRUC-TURE FOR AN INTELLECTUAL PROPERTY EXCHANGE INCLUDING A POINTER TO AN ORACLE AND USER INTERFACE THEREFOR," filed Jun. 6, 2018. U.S. patent application Ser. No. 17/113,082, U.S. Provisional Patent Application No. 62/681,364 and International Patent Application no. PCT/US2019/035469 are, to the extent not inconsistent with the disclosure herein, incorporated by reference.

SUMMARY

According to an embodiment, a computer method for automated data storage and retrieval includes receiving a data object. The data object is intended for immutable access by one or more keyholders. The computer method includes obtaining a storage address corresponding to one or more data storage locations, storing the data object at the one or more data storage locations, and transacting data corresponding to the storage address onto a blockchain data structure. The computer method may include displaying a rendering of the data object on an electronic display of a user device.

According to an embodiment, a computer system includes a peer device capable of providing a graphical user interface to a user. The graphical user interface includes a data object display facility and a data object designation facility. The computer system includes a computer server including a data receiving engine and a distributed file system spooler. The data receiving engine is configured to receive a data object designated by the user via the graphical user interface and the data object designation facility. The distributed file system (DFS) spooler is configured to encode and write the data object to a distributed file system address determined as a function of the encoded data. The computer server further includes a distributed file system address server operatively coupled to the distributed file system spooler. The distributed file system address server is operatively coupled to a distributed file system address encoder configured to receive the distributed file system address from the distributed file system address server and encode the distributed file system address to output a distributed file system address label with a distributed file system address label engine. The computer system includes a second computer server, opera-tively coupled to the computer server, operatively coupled to exchange data with the graphical user interface, and configured to transact data to and from a blockchain. The second computer server is configured to receive a brief summarization data from the graphical user inter-face, receive the distributed file system address label corresponding to the distributed file system address from the distributed file system address label engine, and to transact the brief summarization data and the corresponding distributed file system address label onto the blockchain.

According to an embodiment, a method includes receiv-ing a data object from a user, storing the data object in a distributed file system, and generating a hash value corre-sponding to a storage address of the data object in the distributed file system. The method also includes writing the hash value onto a blockchain.

According to an embodiment, a method includes receiv-ing a request from a user to store a data object, storing the data object in a storage system at a storage location, and writing a storage address pointer onto a blockchain. The storage address pointer identifies the storage location. The method includes receiving a request to access the data object from the storage system, retrieving the storage address pointer from the blockchain, and reading the data object from the storage location based on the storage address pointer.

BRIEF DESCRIPTION OF THE DRAWINGS

FIG. 5 is a flow chart showing a computer method for automated storage and retrieval of data, according to an embodiment.

FIG. 6 is a flow chart showing a computer method for automated storage and retrieval of data, according to an embodiment.

FIG. 7 is a flow chart showing a computer method for automated storage and retrieval of data, according to an embodiment.

DETAILED DESCRIPTION

Figure 1:
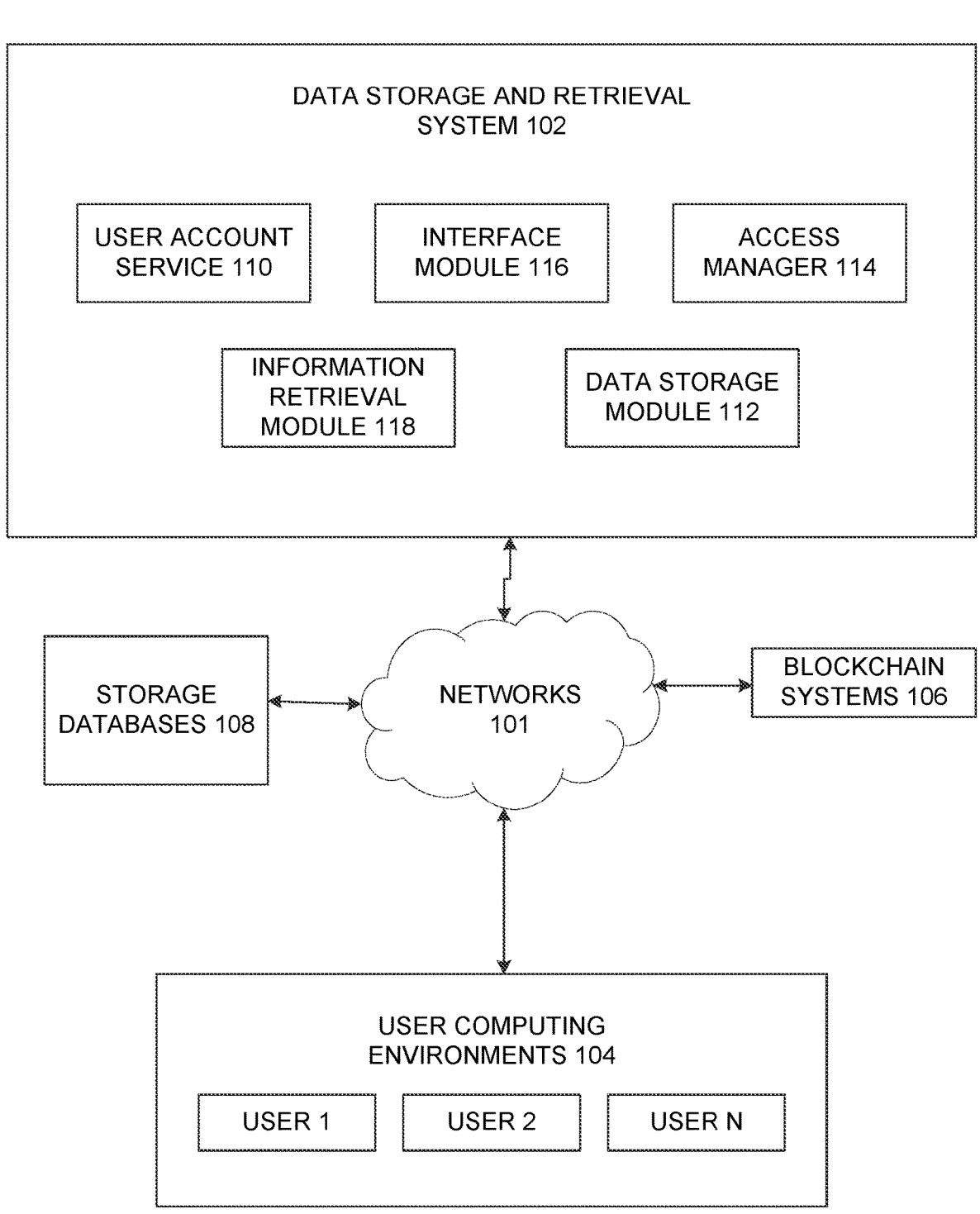
FIG. 1 is a block diagram of production environment including a data storage and retrieval system, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

FIG. 1 illustrates a block diagram of a production envi-ronment 100 for facilitating storage and retrieval of data, according to one embodiment. Embodiments of the present disclosure provide a data storage and retrieval system 102. The data storage and retrieval system 102 enables users to store data files and to ensure access to the stored data files. The data storage and retrieval system 102 utilizes block-chain technology to efficiently and securely provide selec-tive access to store data.

In one embodiment, the data storage and retrieval system 102 enables a user to store a data file at a storage location having a storage address. The data storage and retrieval system 102 records, onto one or more blockchains, the storage address. When an authorized user wishes to access the data file, the data storage and retrieval system 102 accesses the blockchain, retrieves the storage address from the blockchain, and retrieves the data file from the storage location corresponding to the storage address. The data storage and retrieval system 102 then outputs the contents of the data file to the privileged user.

In one embodiment, the production environment 100 includes a data storage retrieval system 102, user computing environments 104, blockchain systems 106, and storage databases 108. The data storage and retrieval system 102, the user computing environments 104, the blockchain systems 106, and the storage databases 108 are connected by one or more networks 101. The networks 101 can include one or more of the Internet, satellite communication networks, cellular communication networks, wireless area networks, local area networks, or other types of networks that can enable computing systems to communicate with each other.

Various types of storage databases 108 are contemplated. In one embodiment, a storage database may include an object present at a static IP address. In another embodiment, a storage database may include a distributed file system (DFS) such as InterPlanetary File System (IPFS).

In one embodiment, the user computing environments 104 correspond to computing environments by which the users of the data storage and retrieval system 102 access the data storage and retrieval system 102. The users of the data storage and retrieval system 102 can utilize one or more of a laptop computer, a tablet, a desktop computer, a smartphone, a wearable smart device, a personal electronic assistant, or other types of computing devices that can communicate with the data storage and retrieval system 102. Accordingly, the user computing environments 104 can include any computing devices or computing systems by which individuals or organizations access the data storage and retrieval system 102.

In one embodiment, the user of the data storage and retrieval system 102 can include an individual, multiple individuals, or an organization. A single individual can create an account with the data storage and retrieval system 102 in order to store data in a manner that provides immutable access to privileged users, and/or to receive immutable access to the stored data. The user can include an individual, a group of individuals, or an organization that wishes to utilize the functions of the data storage and retrieval system 102.

In one embodiment, the data storage and retrieval system 102 utilizes an interface module 116 to enable communication with a user of the data storage and retrieval system 102. The user may access the data storage and retrieval system 102 via the user computing environments 104. The interface module 116 can provide one or more graphical user interfaces to the users. The graphical user interface can enable the users to navigate through menus, options, and services provided by the data storage and retrieval system 102. The graphical user interface can be displayed on a display of an electronic device of the user.

In one embodiment, the data storage and retrieval system 102 uses a user account service 110 to establish and maintain user accounts with the data storage and retrieval system 102. When the individual or the organization wishes to establish an account with the data storage and retrieval system 102, the user first accesses the data storage and retrieval system 102 via a computing device of the user. The interface module 116 provides an interface that enables the user to either log in to the data storage and retrieval system 102, or to create an account with the data storage and retrieval system 102. The user can select to create an account with the data storage and retrieval system 102. When the user selects to create an account with the data storage and retrieval system 102, the interface module 116 can guide the user through the process of creating an account by requesting personal information from the user, or by prompting the user to select a username and a password.

In one embodiment, the user account service 110 receives registration information of the user from the interface module 116. The user account service 110 establishes the user's account with the data storage and retrieval system 102. When the user account service 110 has established the account of the user, the user can then utilize the services of the data storage and retrieval system 102.

In one embodiment, the user account service 110 includes a database of all user accounts. The database can include, for each user, login credentials, personal information, payment information, contact information, or other types of data that may be associated with the account of the user of the data storage and retrieval system 102.

In one embodiment, the data storage and retrieval system 102 utilizes the data storage module 112 to store data files in a way that allows authorized users to access the data files. When a user selects, with the graphical user interface, to store a data file, the data storage module 112 can store the data file at a storage location in the storage database 108. The data storage module 112 interfaces with the blockchain systems 106 to record on one or more blockchains that the data file has been stored. The storage address is recorded in the blockchain.

In one embodiment, the data storage module 112 also records metadata on the blockchain. The metadata indicates characteristics of the data file stored at the storage location corresponding to the storage address. The metadata can indicate a type of the data file. The metadata can indicate a size of the data file.

The metadata can indicate an author or creator of the data file. The metadata can indicate a time at which the data file was created. The metadata can indicate a time at which the data file was immutably stored by the data storage and retrieval system 102. In some cases, the metadata can also indicate which users have access to the data file.

In one embodiment, when the user selects to store the data file with the data storage and retrieval system 102, the data file has already been previously stored in the storage database 108. However, now the data storage module 112 will interface with the blockchain systems 106 to record a transaction on the blockchain indicating the storage address and the associated metadata. Thus, users can initially store data files without transacting the storage onto the blockchain. The users can then later decide to transact the storage onto the blockchain. In this case, the location of the data file may not change. In other cases, the data storage and retrieval system 102 may rewrite the data file to a different storage location and record the transaction on the blockchain.

In one embodiment, the data storage and retrieval system 102 utilizes the information retrieval module 118 to retrieve the data files that are stored in the storage database 108. When an authorized user wishes to retrieve a data file stored in the storage database 108 and transacted onto the blockchain, the information retrieval module 118 interfaces with the blockchain systems 106 and accesses the blockchain. The information retrieval module 118 reads the blockchain and retrieves the storage address associated with the data file. The information retrieval module 118 then retrieves the data file from the storage location in the storage databases 108.

In one embodiment, after the information retrieval module 118 has retrieved the data file, the interface module 116 outputs the contents of the data file to the user. This can include displaying the contents of the data file to the user in the user interface. Outputting the contents of the data file can also include accessing another program installed on the computing device of the user to open the data file and display the contents of the data file. Outputting the contents of the data file can also include providing a copy of the data file to the user.

In one embodiment, the data storage and retrieval system 102 utilizes the access manager 114 to ensure that only authorized users are able to retrieve or view the data files. When a user stores a data file with the data storage and retrieval system 102, the user can indicate which users are authorized to access the data file. This can include indicating that all users are authorized to access the data file. This can include indicating that a specified subgroup of users are authorized to access the data file. This can include indicating individual users that are authorized to access the data file. The access manager 114 ensures that only the authorized users can access the data file.

In one embodiment, when an authorized user requests to access the contents of a data file, before the information retrieval module 118 retrieves the data file, the access manager 114 first checks to ensure that the user is authorized to access the data file. If the user is authorized, then the information retrieval module 118 can retrieve the data file and provide the contents of the data file to the user.

In one embodiment, when the user selects to store the data file with the data storage and retrieval system 102, the data storage module 112 stores a modified version of the data file. In particular, the data storage module 112 encrypts the data file and stores the encrypted data file to one or more storage locations.

In one embodiment, when the information retrieval module 118 retrieves the encrypted data file at the request of the user, the information retrieval module 118 first decrypts the data file. The information retrieval module 118 then outputs the contents of the decrypted data file to the user.

In one embodiment, the information retrieval module 118 decrypts the encrypted data file with a public encryption key. Additionally or alternatively, the information retrieval module 118 can decrypt the encrypted data file with a private encryption key.

In one embodiment, the data storage module 112 encrypts the storage address and writes the encrypted storage address to the blockchain. The blockchain itself may also be an encrypted blockchain. When the information retrieval module 118 retrieves the storage address from the blockchain, in one embodiment, the information retrieval module 118 first decrypts the encrypted storage address. In one embodiment, the information retrieval module 118 decrypts the encrypted blockchain before decrypting the encrypted storage address.

In one embodiment, the data storage and retrieval system 102 stores many types of data files and writes their corresponding storage addresses to the blockchain systems 106. In one embodiment, the stored data files can include documents, video files, video streams, audio files, audio streams, images, program files, software instructions, or other types of data files. When an authorized user accesses the data file, the graphical user interface may display the corresponding document, may play the corresponding video file, may play the corresponding video stream, may play the corresponding audio file, may play the corresponding audio stream, or may display the corresponding image or images. Additionally or alternatively, the data storage and retrieval system 102 can open third-party programs to display or otherwise output the retrieved data files. Additionally or alternatively, the data storage and retrieval system 102 can provide a copy of the data file to the user and the user can store a copy locally.

In one embodiment, the storage databases 108 include a distributed file system. When the data storage and retrieval system 102 stores a data file, the data file is stored in the distributed file system. The distributed file system stores the data file across multiple locations. This helps to protect the data file from being deleted or corrupted.

In one embodiment, when a data file is stored in the distributed file system, the storage address of the data file is determined by the contents of the data file. In particular, the contents of the data file are cryptographically hashed. A hash function generates a hash based on a hashing algorithm and the contents of the data file. The hash corresponds to the storage address of the data file.

In one embodiment, the data storage module 112 writes a hash value onto the blockchain. When the data file is retrieved, the hash value is read from the blockchain. The data file can then be retrieved based on the hash value.

In one embodiment, the data storage and retrieval system 102 provides additional protection to the storage address in the blockchain by obscuring the hash value. Obscuring the hash value can include encoding the hash value. After the data file has been stored in the distributed file system and the corresponding hash value has been generated, the data storage and retrieval system 102 encodes the hash value and writes the encoded hash value onto the blockchain. When the data storage and retrieval system 102 seeks to retrieve the data file, the data storage and retrieval system 102 accesses the blockchain, decodes the encoded hash value and retrieves the data file based on the decoded hash value.

In one embodiment, after the hash value has been obscured, the data storage and retrieval system 102 breaks the obscured hash value apart into constituent bytes. For example, a typical hash, including an obscured hash, is a data string of defined length. However, the defined length of the data string can be much longer than a typical encoded hash. In this case, most of the data values in the data string subsequent to an end of the encrypted hash are empty or populated with values of 0. In order to avoid taking up extra space in the blockchain, the data storage and retrieval system 102 breaks the encoded hash value string apart into its constituent bytes and stores the bytes in the blockchain. The bytes that correspond to the remaining empty portions of the hash value string are not stored in the blockchain. In this way, the data storage and retrieval system 102 makes more efficient use of the blockchain.

In one embodiment, the distributed file system is hosted in a cloud computing platform. The cloud computing platform can include, as some examples, Amazon Web Services (AWS), Google Cloud Platform, Microsoft Azure, and IBM Bluemix. Accordingly, the distributed file system is distributed in a cloud computing platform, in one embodiment. In another embodiment, storage database(s) 108 comprise a conventional database or file storage system. For example, the file storage may be on a user computer or on a private server, such as on a RAID drive behind a corporate firewall. Similarly, a distributed file system may be resident on private network.

In one embodiment, the distributed file system is a peer-to-peer distributed file system.

In one embodiment, the distributed file system is an InterPlanetary File System (IPFS) distributed file system. In one embodiment, the distributed file system is a Filecoin distributed file system. In one embodiment, the distributed file system includes a Swarm distributed file system. In one embodiment, the distributed file system includes a Gaia distributed file system. Those of skill in the art will recognize, in light of the present disclosure, that other distributed file systems can be used without departing from the scope of the present disclosure.

In one embodiment, the distributed file system is a private distributed file system accessible only by privileged users. In one embodiment, the distributed file system is a public distributed file system. In one embodiment, the one or more blockchains are private or permissioned blockchains. In one embodiment, the one or more blockchains are public blockchains. In some embodiments, the one or more blockchains may be referred to as a distributed ledger.

In one embodiment, a user can access the data storage and retrieval system 102 via a dedicated software application stored on and executed, at least in part, by the computing device of the user. The software application presents the graphical user interface to the user on the display of the electronic device of the user. The software application can present summary information and additional information in the graphical user interface. Some modules, services, or systems of the data storage and retrieval system 102 may be stored on and executed by the user computing device.

In one embodiment, a user can access the data storage and retrieval system 102 via a web browser. In this case, the data storage and retrieval system 102 provides the graphical user interface in the web browser. The user can access the data storage and retrieval system 102 by navigating to a web address associated with the data storage and retrieval system 102 and logging into the data storage and retrieval system 102. The data storage and retrieval system 102 can present the summary information and the additional detailed information via a user interface momentum with a website of the data storage and retrieval system 102. In one embodiment, the data storage and retrieval system 102 can present the additional information to the user by opening an additional window or a tab of the web browser.

Figure 2:
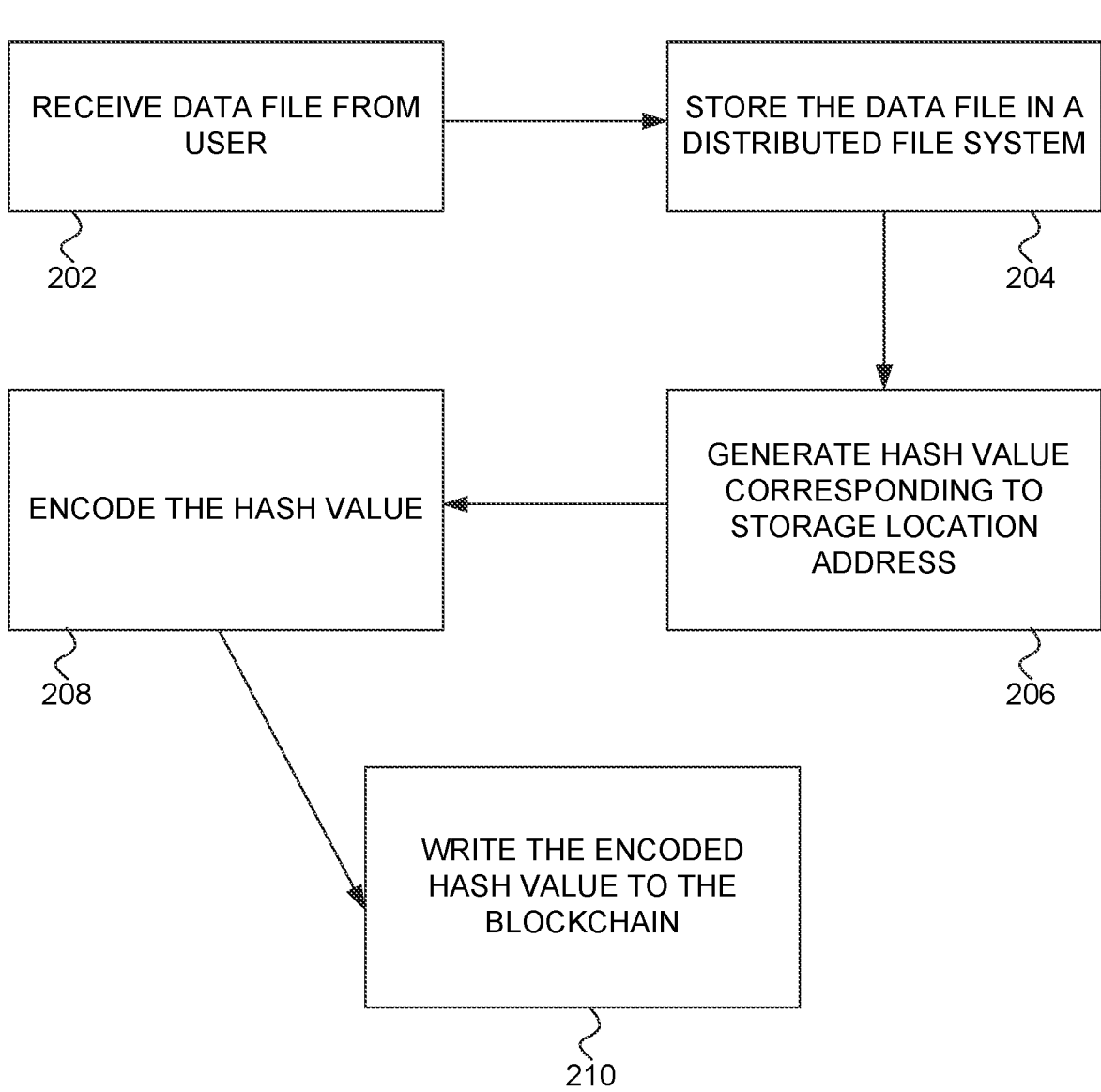
FIG. 2 is a flow chart of a process for storing data in a distributed file system for future retrieval, according to an embodiment.

FIG. 2 is a flow chart showing a computer method 200 for storing a data file with a data storage and retrieval system, according to one embodiment.

In one embodiment, at 202, the data storage and retrieval system receives the data file from a user. The data storage and retrieval system can also receive an indication that the user wishes to store the data file in a file storage system associated with the data storage and retrieval system.

At 204, the data storage and retrieval system stores the data file in a distributed file system.

In one embodiment, at 206, the data storage and retrieval system generates a hash value corresponding to a storage location address of the data file in the distributed file system.

In one embodiment, at 208, the data storage and retrieval system encodes the hash value. Alternatively, the data storage and retrieval system can obscure the hash value with a method other than encoding.

In one embodiment, the data storage and retrieval system writes the encoded hash value to a blockchain. Alternatively, the data storage and retrieval system may store the hash value in an unobscured manner.

Figure 3:
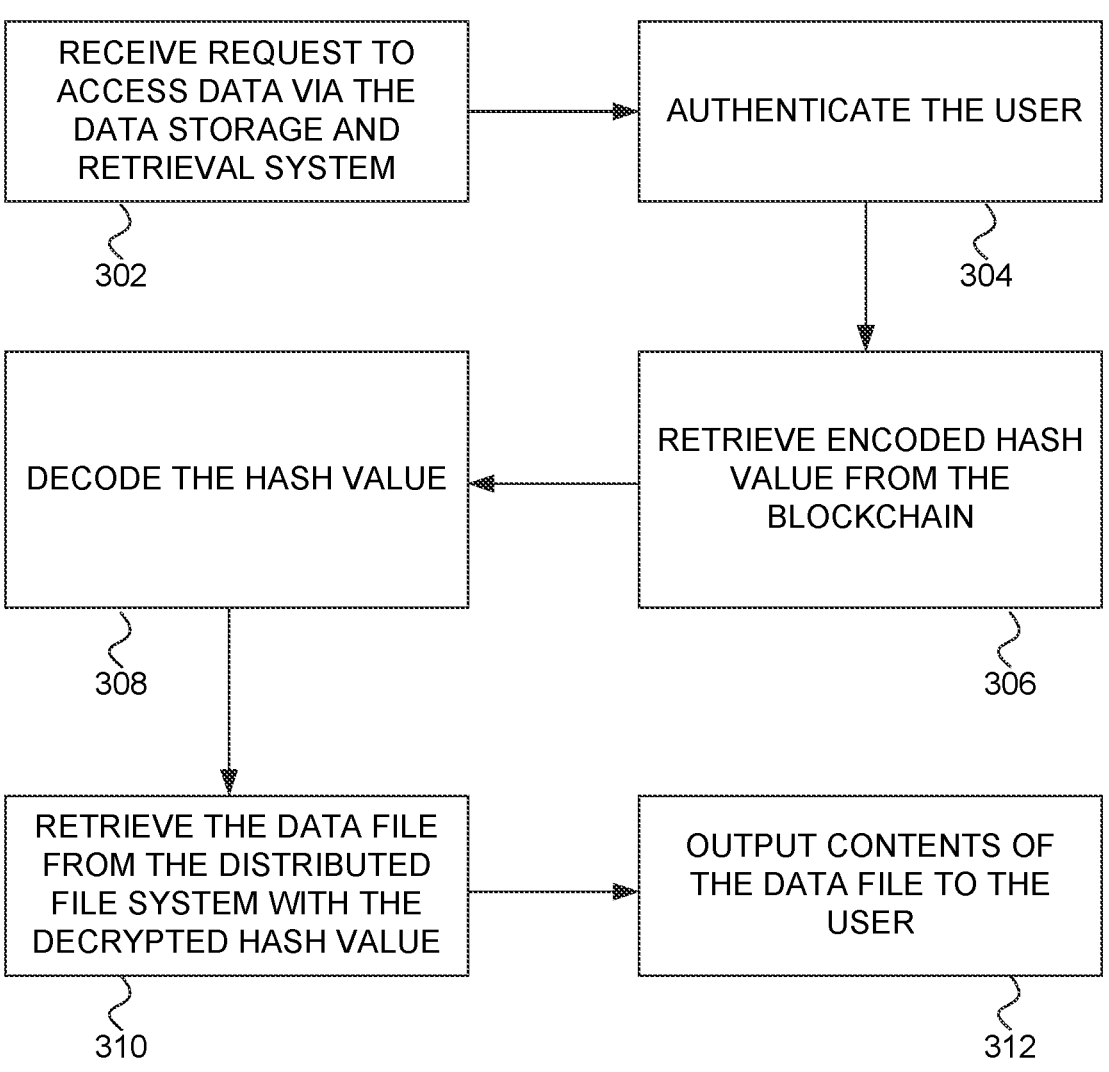
FIG. 3 is a flow chart of a process for retrieving data from a distributed file system, according to an embodiment.

FIG. 3 is a flow chart showing a computer method 300 for retrieving data with a data storage and retrieval system, according to an embodiment.

In one embodiment, at 302, the data storage and retrieval system receives a request from a user to access a data file via the data storage and retrieval system.

In one embodiment, at 304, the data storage and retrieval system authenticates the user. This can include receiving one or more of a password, a username, a dual factor authentication, and a biometric authentication.

In one embodiment, at 306, the data storage and retrieval system retrieves the encoded hash value from the blockchain.

In one embodiment, at 308, the data storage and retrieval system decodes the hash value.

In one embodiment, at 310, the data storage and retrieval system retrieves the data file from the distributed file system with the encoded hash value.

In one embodiment, at 312, the data storage and retrieval system outputs contents of the data file to the user.

Figure 4:
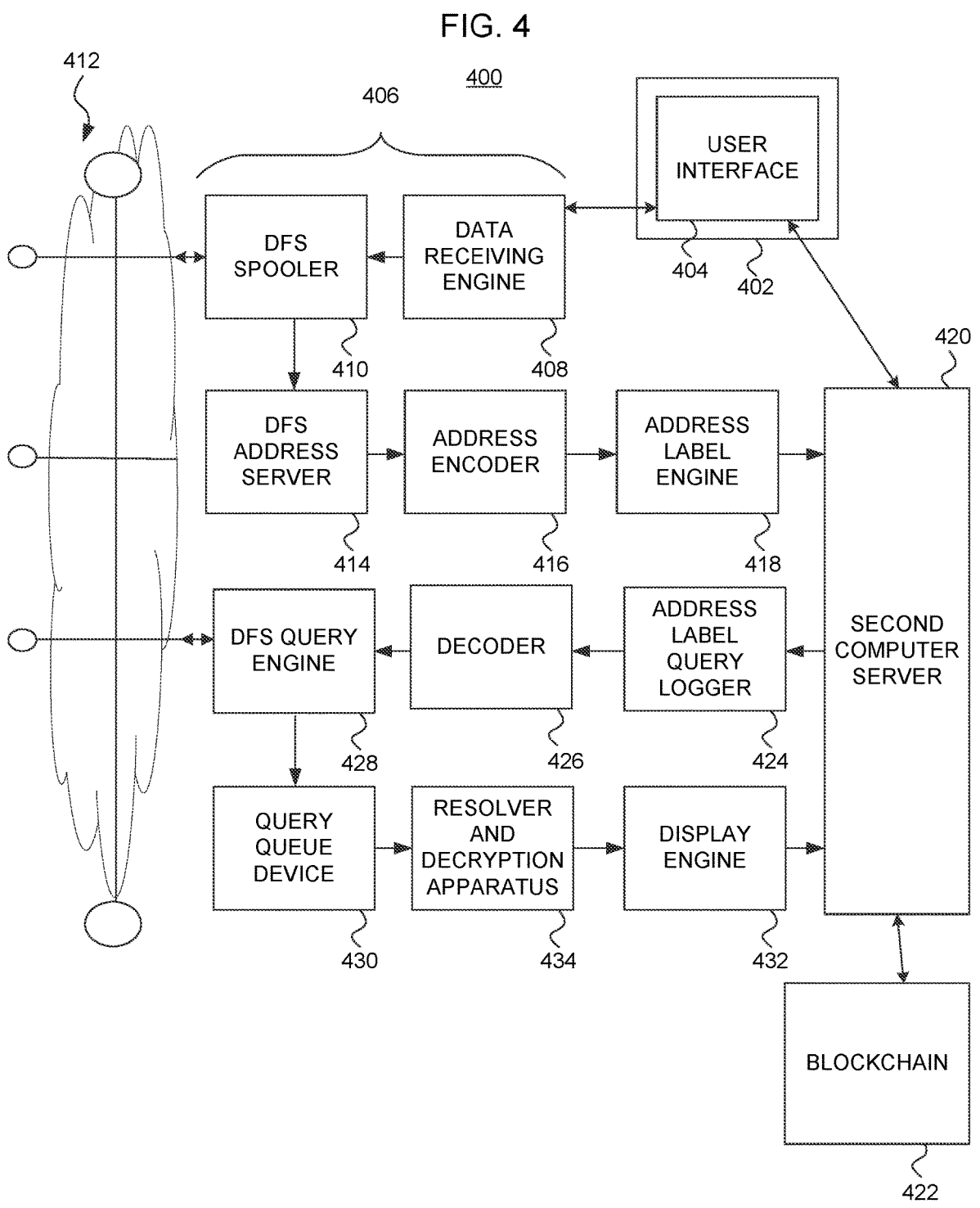
FIG. 4 is a block diagram of computer system, according to an embodiment.

FIG. 4 is a block diagram of computer system 400, according to an embodiment. The computer system 400 is configured to provide encrypted, privileged, immutable access to data.

In one embodiment, the computer system 400 includes a peer device 402 capable of providing a graphical user interface 404 to a user. The graphical user interface 404 includes a data object display facility and a data object designation facility.

In one embodiment, the computer system 400 includes a computer server 406 including a data receiving engine 408 and a distributed file system spooler 410. The data receiving engine 408 is configured to receive a data object designated by the user via the graphical user interface 404 and the data object designation facility. The distributed file system spooler 410 is configured to encode and write the data object to a distributed file system address 412 determined as a function of the encoded data.

In one embodiment, the computer server 406 includes a distributed file system address server 414 operatively coupled to the distributed file system spooler 410. The distributed file system address server 414 is operatively coupled to a distributed file system address encoder 416. The distributed file system address encoder 416 is configured to receive the distributed file system address 412 from the distributed file system address server 414 and encode the distributed file system address 412 to output a distributed file system address label with a distributed file system address label engine 418.

In one embodiment, the computer system 400 includes a second computer server 420 operatively coupled to the computer server 406. The second computer server 420 is operatively coupled to exchange data with the graphical user interface 404. The second computer server 420 is configured to transact the data to and from a blockchain 422.

In one embodiment, the second computer server 420 is configured to receive a brief summarization data from the graphical user interface 404 and to receive the distributed file system address label corresponding to a distributed file system address 412 from the distributed file system address label engine 418. The second computer server 420 is configured to transact the brief summarization data and the corresponding distributed file system address label onto the blockchain 422.

In one embodiment, the second computer server 420 is further configured to respond to a credentialed user of the peer device 402 to designate an object for display using the graphical user interface 404. The second computer server 420 is configured to operate a distributed file system address label query and logger module 424 to output a distributed file system query using the distributed file system address label to a decoder 426. The decoder 426 is configured to decode the distributed file system address label to convert it into a distributed file system address 412.

In one embodiment, the computer server 406 operates the decoder 426 and launches a distributed file system query with a distributed file system query engine 428 using the decoded distributed file system address 412 to fetch corresponding data and load the corresponding data into a distributed file system query queue device 430.

In one embodiment, the computer server 406 or the second computer server 420 receives the data into a display engine 432. The received data corresponds to the distributed file system data and causes the data to be displayed or played back in the graphical user interface 404 of the peer device 402.

In one embodiment, the computer server 406 further includes a resolver and decryption apparatus 434 configured to convert the distributed file system data into a format suitable for the display engine 432.

In one embodiment, the data corresponding to the distributed file system data received into the display engine 432 includes the distributed file system data converted into the format suitable for the display engine 432.

FIG. 5 is a flow chart showing a computer method 500 for automated data storage and retrieval, according to an embodiment.

In one embodiment, at 502, a data object is received. The data object is intended for immutable access by one or more keyholders.

In one embodiment, at 504, a storage address is received corresponding to one or more data storage locations.

In one embodiment, at 508, the data object is stored at the one or more data storage locations.

In one embodiment, at 512, data is transacted onto a blockchain data structure. The data corresponds to a storage address.

In one embodiment, at 514, a rendering of the data object is displayed on a display of a user device.

In one embodiment, at 506, a modified data object is produced by encrypting the data object. Storing the data object, at 508, can include storing the modified data object at the one or more data storage locations.

In one embodiment, at 510, the storage address is encrypted. In this case, transacting the data corresponding to the storage address onto the blockchain data structure can include transacting the encrypted storage address onto the blockchain data structure.

In one embodiment, the computer method 500 includes retrieving a rendering of the data object.

In one embodiment, the computer method 500 includes generating and distributing one or more public keys for retrieval of the data object.

In one embodiment, the computer method 500 includes generating and distributing one or more private keys for retrieval of the data object.

In one embodiment, the one or more data storage locations include a distributed file system accessed by the storage address.

In one embodiment, the storage address includes a distributed file system storage address.

In one embodiment, storing the data object includes storing the data object in the distributed file system storage address.

In one embodiment, the storage address is a hash value. The computer method 500 can include generating the hash value based on the contents of the data object.

In one embodiment, transacting data corresponding to the storage address onto the blockchain data structure, at 512, includes writing the hash value onto the blockchain data structure.

In one embodiment, the computer method 500 can include generating an obscured hash value from the hash value. Transacting the data corresponding to the storage address onto the blockchain data structure, at 512, can include writing the obscured hash value onto the blockchain data structure. The obscured hash value can be an encoded hash value. Encoding the hash value can include encrypting the hash value.

In one embodiment, the computer method 500 includes retrieving the obscured hash value from the blockchain data structure, retrieving the hash value from the obscured hash value, and retrieving the data object from the distributed file system by using the hash value as the storage address. The computer method 500 can include retrieving the obscured hash value from the blockchain data structure, retrieving the hash value from the obscured hash value, and retrieving the data object from the distributed file system by using the hash value as the storage address. Retrieving the hash value from the obscured hash value can include decoding or decrypting the hash value.

In one embodiment, the computer method 500 includes retrieving the hash value from the blockchain data structure and retrieving the data object from the distributed file system by using the hash value as the storage address.

In one embodiment, the data object is a data file. The data file can be a video file. The data file can be an audio file. The data file can be an electronic document, or an electronic copy of a document.

FIG. 6 is a flow chart showing a computer method 600 for automated data storage and retrieval, according to an embodiment.

In one embodiment, at 602, a data object is received from a user.

In one embodiment, at 604, the data object is stored in a distributed file system.

In one embodiment, at 606, a hash value is generated corresponding to a storage address of the data object in the distributed file system.

In one embodiment, at 608, the hash value is written onto a blockchain.

In one embodiment, at 610, a request is received to access the data object from the distributed file system.

In one embodiment, at 612, the hash value is retrieved from the blockchain.

In one embodiment, at 614, the data object is read from the distributed file system.

In one embodiment, the computer method 600 includes generating an obscured hash value. The obscured hash value can include an encoded hash value. Writing the hash value onto the blockchain, at 608, can include writing the obscured hash value onto the blockchain. The computer method 600 can further include retrieving the obscured hash value from the blockchain, retrieving the hash value from the obscured hash value from the blockchain, and reading the data object from the distributed file system.

In one embodiment, the access request can be received from the user. In this case, the computer method 600 can further include outputting contents of the data object to the user. The computer method 600 can also include authenticating the user prior to retrieving the obscured hash value.

Authenticating the user can include determining whether the user has permission to access the data object. In one embodiment, outputting the contents of the data object includes displaying the contents of the data object on a display of an
electronic device of the user.

In one embodiment, the access request is really received from a second user. In this case, the computer method 600 can include outputting the contents of the data object to the second user. The computer method 600 can include authenticating the second user prior to retrieving the obscured hash value.

Authenticating the second user can include determining whether the second user has permission to access the data object. Outputting the contents of the data object can include displaying the contents of the data object on a display of an electronic device of the second user.

In one embodiment, the distributed file system is a private distributed file system. Alternatively, the distributed file system can be a public distributed file system.

In one embodiment, the blockchain is a public blockchain. Alternatively, the blockchain can be a private blockchain.

In one embodiment, writing the hash value onto the blockchain, at 608, includes breaking the hash value into constituent bytes of data and storing the hash value onto the blockchain as individual bytes rather than as a data string.

In one embodiment, at 612, the computer method 600 can include retrieving the hash value from the blockchain by reconstructing the hash value from the individual bytes and retrieving the data object from the distributed file system by using the hash value as the storage address.

In one embodiment, the computer method 600 includes generating and obscuring the hash value. Obscuring the hash value can include encoding the hash value. Writing the hash value onto the blockchain, at 608, can include breaking the obscured hash value into constituent bytes of data and storing the obscured hash value onto the blockchain as individual bytes rather than as a
data string. The computer method 600 can further include retrieving the obscured hash value from the blockchain by reconstructing the obscured hash value from the individual bytes, unobscuring the obscured hash value, and retrieving the data object from the distributed file system by using the hash value as the storage address.

In one embodiment, the distributed file system is an InterPlanetary File System.

FIG. 7 is a flow chart showing a computer method 700 for automated data storage and retrieval, according to an embodiment.

In one embodiment, at 702, a request is received from a user to store a data object.

In one embodiment, at 704, the data object is stored in a storage system at a storage location.

In one embodiment, at 706, a storage address pointer is written onto a blockchain. The storage address pointer identifies the storage location.

In one embodiment, at 708, a request is received to access the data object from the storage system.

In one embodiment, at 710, the storage address pointer is retrieved from the blockchain.

In one embodiment, at 712, the data object is read from the storage location based on the storage address pointer.

In one embodiment, the computer method 700 includes generating the storage address pointer by encrypting the storage address. The computer method 700 can include, after retrieving the storage address pointer from the blockchain, decrypting the storage address pointer and retrieving the data object
based on the storage address.

In one embodiment, the storage system is a distributed file system. The storage address pointer can be a hash value corresponding to the storage address within the distributed file system. The storage address pointer can be an obscured hash value generated from a hash value corresponding to the storage
address within the distributed file system.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A computer method for data storage and retrieval, including:
   generating a hash value corresponding to a storage address of a data object in one or more data storage locations;
   generating an obscured hash value by encoding the hash value, the obscured hash value being a data string comprising a plurality of data values wherein a subset of the data values are empty or have a value of zero;
   breaking the obscured hash value into constituent bytes of data, each constituent byte of data being a data value of the plurality of data values;
   transacting the bytes of data having a data value that are not empty or equal to zero and metadata of the data object onto a blockchain data structure, the blockchain data structure being separate from the one or more data storage locations; and
   displaying a rendering of the data object on an electronic display of a user device.

2. The computer method of claim 1, wherein encoding the hash value comprises encrypting the hash value.

3. The computer method of claim 1, further comprising producing a modified data object by encrypting the data object.

4. The computer method of claim 1, wherein the one or more data storage locations include a distributed file system accessed by the storage address.

5. The computer method of claim 1, further comprising:
   retrieving the obscured hash value from the blockchain data structure;
   retrieving the hash value from the obscured hash value; and
   retrieving the data object from the distributed file system by using the hash value as the storage address.

6. The computer method of claim 5, wherein the retrieving the hash value from the obscured hash value includes decrypting the hash value.

7. A computer system, comprising:

a peer device configured to:

provide a graphical user interface to a user, the graphical user interface including a data object display facility and a data object designation facility;

a computer server including:

a data receiving engine configured to:

receive a data object designated by the user via the graphical user interface and the data object designation facility;

a distributed file system spooler configured to:

encode and write the data object to a distributed file system address determined as a function of the encoded data;

a distributed file system address server operatively coupled to the distributed file system spooler, the distributed file system address server being operatively coupled to a distributed file system address encoder, the distributed file system address encoder being configured to:

receive the distributed file system address from the distributed file system address server, encode the distributed file system address to output a distributed file system address label with a distributed file system address label engine, generate a hash value corresponding to distributed file system address;

generating an obscured hash value by encoding the hash value, the obscured hash value being a data string comprising a plurality of data values wherein a subset of the data values are empty or have a value of zero; and a second computer server, operatively coupled to the computer server, operatively coupled to exchange data with the graphical user interface, and configured to:

break the obscured hash value into constituent bytes of data, each constituent byte of data being a data value of the plurality of data values, and transact a brief summarization data and the corresponding distributed file system address label onto the blockchain.

8. The computer system of claim 7, wherein the second computer server is further configured to respond to a credentialed user of the peer device to designate an object for display using the graphical user interface, operate a distributed file system address label query and logger module to output a distributed file system query using the distributed file system address label to a decoder, the decoder being configured to decode the distributed file system address label to convert it into the distributed file system data address.

9. The computer system of claim 8, wherein the computer server operates the decoder and launches the distributed file system query with a distributed file system query engine using the decoded distributed file system address to fetch the corresponding data and load the corresponding data into a distributed file system query queue device.

10. A method, comprising, generating a hash value corresponding to a storage address of a data object in a distributed file system;

generating an obscured hash value by encoding the hash value, the obscured hash value being a data string comprising a plurality of data values wherein a subset of the data values are empty or have a value of zero;

breaking the obscured hash value into constituent bytes of data, each constituent byte of data being a data value of the plurality of data values; and writing the bytes of data having a data value that are not empty or equal to zero and metadata of the data object onto a blockchain, the blockchain being separate from the distributed file system.

11. The method of claim 10, further comprising:

receiving a request to access the data object from the distributed file system;

retrieving the encoded hash value from the blockchain;

decoding the encoded hash value from the blockchain; and reading the data object from the distributed file system.

12. The method of claim 11, further comprising authenticating the user prior to retrieving the encoded hash value, wherein the authenticating the user includes determining whether the user has permission to access the data object, and outputting the contents of the data object by displaying the contents of the data object on a display of an electronic device of a user.

13. The method of claim 10, wherein the writing the hash value onto the blockchain includes breaking the hash value into constituent bytes of data and storing the hash value onto the blockchain as individual bytes rather than as a data string.

14. A method, comprising:

generating a storage address pointer, the storage address pointer identifying a storage location of a data object;

generating a hash value corresponding to a storage address of the data object within the storage location;

generating an obscured hash value by encoding the hash value, the obscured hash value being a data string comprising a plurality of data values wherein a subset of the data values are empty or have a value of zero;

breaking the obscured hash value into constituent bytes of data, each constituent byte of data being a data value of the plurality of data values;

writing the bytes of data having a data value that are not empty or equal to zero and metadata of the data object onto a blockchain, the blockchain data structure being separate from the data storage location;

receiving a request to access the data object from the storage system;

retrieving the storage address pointer from the blockchain; and reading the data object from the storage location based on the storage address pointer.

15. The method of claim 14, further comprising generating the storage address pointer by encrypting a storage address.

16. The method of claim 15 further comprising, after the retrieving the storage address pointer from the blockchain, decrypting the storage address pointer and retrieving the data object based on the storage address.

17. The method of claim 14, wherein the obscured hash value is an encrypted hash value.

* * * * *